United States Patent
Seethaler et al.

(10) Patent No.: US 10,706,822 B2
(45) Date of Patent: Jul. 7, 2020

(54) DEVICE CONFIGURATION USING ORIENTATION CUES

(71) Applicant: Lenovo (Singapore) Pte. Ltd., Singapore (SG)

(72) Inventors: Kenneth Scott Seethaler, Raleigh, NC (US); David W. Douglas, Cary, NC (US); Aaron Michael Stewart, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/938,688

(22) Filed: Mar. 28, 2018

(65) Prior Publication Data

US 2019/0304408 A1    Oct. 3, 2019

(51) Int. Cl.
| | |
|---|---|
| *G09G 5/38* | (2006.01) |
| *G06K 9/62* | (2006.01) |
| *G06F 3/0346* | (2013.01) |
| *G06F 3/03* | (2006.01) |
| *G06T 7/73* | (2017.01) |

(52) U.S. Cl.
CPC ............ *G09G 5/38* (2013.01); *G06F 3/0304* (2013.01); *G06F 3/0346* (2013.01); *G06K 9/6202* (2013.01); *G06T 7/73* (2017.01); *G09G 2340/0492* (2013.01)

(58) Field of Classification Search
CPC .... G06T 7/00; G06T 7/70; G06T 7/73; G06T 7/80; G06F 3/0304; G06F 3/0346; G09G 5/38; G09G 2340/0492; G06K 9/3208; G06K 9/6202; G06K 9/4604; G06K 9/32; G06K 9/00335

USPC ........................................................ 345/659
See application file for complete search history.

(56) References Cited

U.S. PATENT DOCUMENTS

| | | | |
|---|---|---|---|
| 8,471,869 B1* | 6/2013 | Tseng ................. | G09G 5/00 345/156 |
| 2010/0066763 A1* | 3/2010 | MacDougall ........ | G06F 1/1626 345/656 |
| 2011/0115902 A1* | 5/2011 | Jiang ................... | H04W 4/026 348/135 |
| 2013/0201219 A1* | 8/2013 | Zhao .................... | G06F 3/012 345/649 |
| 2014/0049563 A1* | 2/2014 | Tobin ................... | G06F 3/012 345/649 |
| 2014/0247279 A1* | 9/2014 | Nicholas .............. | G06T 19/006 345/633 |
| 2014/0267406 A1* | 9/2014 | Mullins ................ | G06T 19/006 345/633 |
| 2014/0300640 A1* | 10/2014 | Kazanjian ............ | G06F 1/1684 345/659 |
| 2014/0354690 A1* | 12/2014 | Walters ................ | G06T 19/006 345/633 |
| 2015/0109511 A1* | 4/2015 | Gardiner ............. | G06F 1/1626 348/333.12 |

(Continued)

*Primary Examiner* — Sae Won Yoon
(74) *Attorney, Agent, or Firm* — Ference & Associates LLC

(57) ABSTRACT

One embodiment provides a method, including: detecting, using one or more sensors, data associated with a device orientation; determining, using the data and at least one feature of an environment of the device, a device configuration; and implementing the determined device configuration on the device. Other aspects are described and claimed.

18 Claims, 3 Drawing Sheets

(56) References Cited

U.S. PATENT DOCUMENTS

2015/0123966 A1\* 5/2015 Newman ............... G06T 19/006
                                                                                               345/419
2016/0224855 A1\* 8/2016 Al-Hamad ............. G01C 11/04
2016/0379598 A1\* 12/2016 Nguyen ................ G09G 5/363
                                                                                               345/635

\* cited by examiner

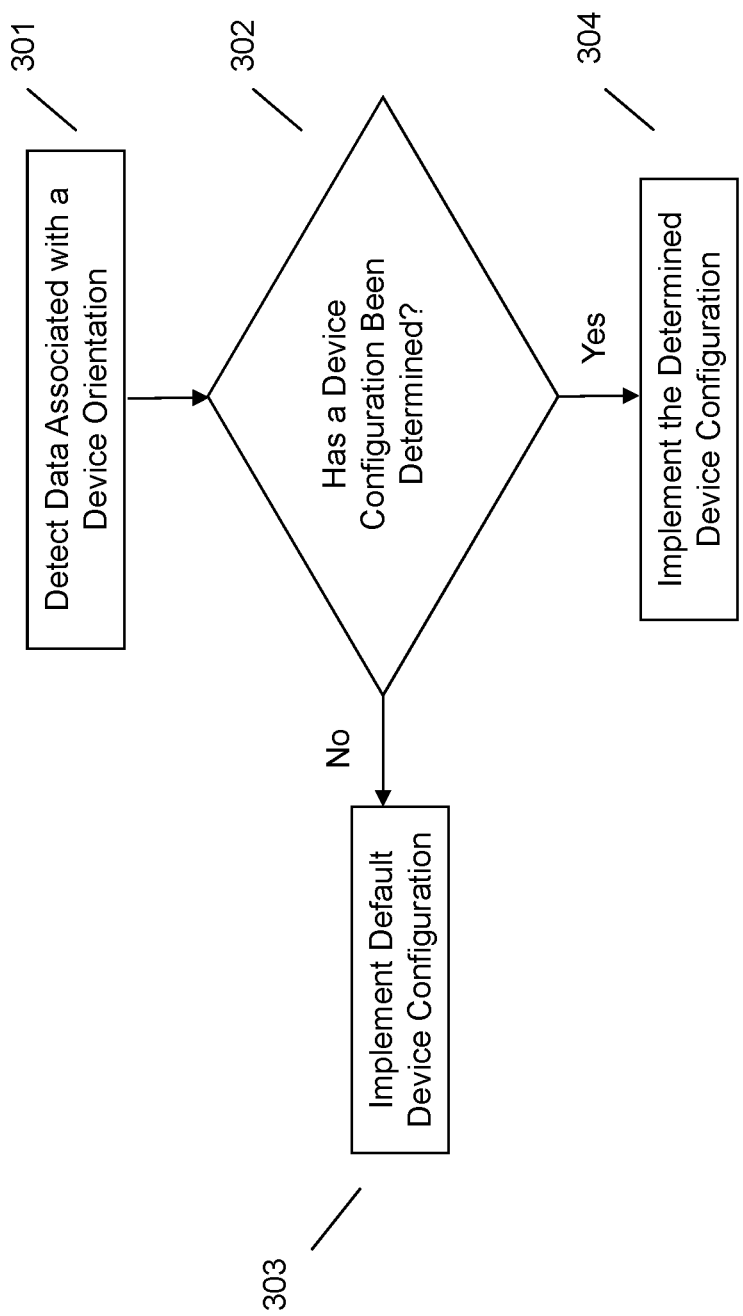

DEVICE CONFIGURATION USING ORIENTATION CUES

BACKGROUND

Information handling devices ("devices"), for example smart phones, tablet devices, smart televisions, smart speakers, laptop and personal computers, and the like, may be capable of changing the display configuration based upon the orientation of the device. For example, the device may receive orientation data that indicates the display should be rotated 90° from the previous display orientation. To determine the orientation the system may receive information from one or more sensors of the device that indicate an orientation or position of the device. The ability to change the device configuration improves the user experience.

BRIEF SUMMARY

In summary, one aspect provides a method, comprising: detecting, using one or more sensors, data associated with a device orientation; determining, using the data and at least one feature of an environment of the device, a device configuration; and implementing the determined device configuration on the device.

Another aspect provides an information handling device, comprising: one or more sensors; a processor; a memory device that stores instructions executable by the processor to: detect, using the one or more sensors, data associated with a device orientation; determine, using the data and at least one feature of an environment of the device, a device configuration; and implement the determined device configuration on the device.

A further aspect provides a product, comprising: a storage device that stores code, the code being executable by a processor and comprising: code that detects, using the one or more sensors, data associated with a device orientation; code that determines, using the data and at least one feature of an environment of the device, a device configuration; and code that implements the determined device configuration on the device.

An additional aspect provides a method, comprising: detecting, using one or more image capture sensors, a device orientation based upon at least one feature of an environment of the device; determining, based upon the detected device orientation, a device configuration; and implementing the determined device configuration on the device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 3 illustrates an example method of determining a device configuration using orientation data and at least one feature of an environment of the device.

DETAILED DESCRIPTION

Figure 1:
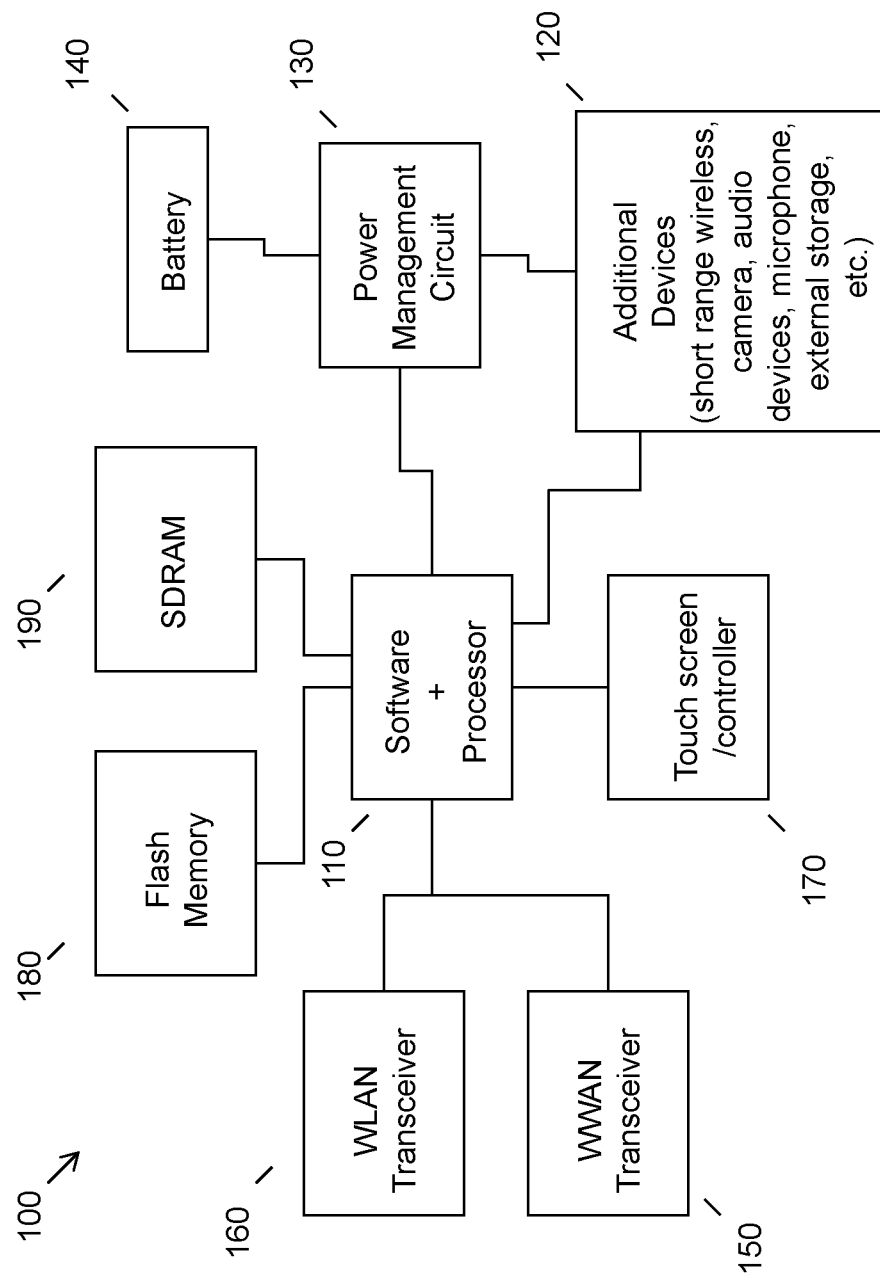
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

An increasing number of users are utilizing devices in daily life. These devices may include smartphones, tablets, computers, laptops, and the like. Many of these devices contain one or more screens, touch screens, or any of a multiple of input/output modalities. To increase user experience, the devices may include components that allow use of the device in multiple configurations, for example, the device may be used in portrait configuration, landscape configuration, multiple display configuration, tent configuration, easel configuration, laptop configuration, tablet configuration, and the like. Thus, the system may perform different functions in order to support the different configurations, for example, screen rotations, displays moving to different screens, or the like.

In traditional devices, the device configuration is based upon the orientation of the device as detected using one or more sensors, for example, accelerometers, gyroscopes, g-sensors, inertial sensors, and the like. For example, in current systems, a device or system associated with the device may use inertial sensors to determine an orientation of a device. As an example, a tablet may contain inertial sensors to determine a proper screen orientation based upon the way a user is currently holding the device. In other words, the tablet and associated inertial sensors may maintain text on a screen in a proper configuration as a user turns the tablet from a portrait to landscape orientation. As another example, when in a closed-lid mode (a traditional laptop clamshell closed) or in a tablet mode (where the device's touch screen or main display is rotated outward), the sensors may detect a position of the device and implement a proper configuration of the device.

However, since the current systems rely on sensors that are triggered based upon movement by the device, if one or more of the sensors fail to detect a motion, the system may not change the configuration as desired by a user. Thus, current systems do not maintain a proper orientation with some user movements. For example, current systems do not properly detect a movement of a device in some axes. For example, if a tablet is lying flat on a table and a user turns the tablet upon the flat surface, inertial sensors may not detect the movement or provide a properly configured display on a display device. The response of the traditional types of sensors used to detect a device orientation may not detect very slow movement or movement about an axis. Movement may be especially difficult to detect if the movement is about an axis in which inertial changes upon a device are small. For example, rotating a device on a flat surface may not be detected by current device sensors. Users may have to give a device a "shake" or "slap" to properly orient the device. Such movements may lessen the user experience, may damage a device, or may be cumbersome if devices are large or if a user's hands are otherwise occupied.

Accordingly, the systems and methods as described herein provide a technique for using environmental features to determine the orientation of the device within an environment. Environmental features may include information associated with the environment that the device is currently located within. The system may capture information, using one or more sensors different form the orientation sensors, related to the environment to assist in determining the orientation of the device within the environment. For example, the system may capture information related to a wall or feature of the wall to determine if the device orientation is perpendicular or parallel to the wall. As another example, the system may capture information related to a ceiling tile to determine that the device is being oriented differently within an environment. Based upon the orientation data and the environmental features, the system can determine a device configuration to be implemented. Thus, an embodiment enhances the data captured from the orientation sensors using the environmental feature information. Using additional sensor information in combination with sensor data traditionally associated with the orientation of the device may allow a device to better determine a device orientation within an environment. Using this spatial information relative to the device, an embodiment automatically implements a configuration for the device.

As will be readily apparent from this description, various embodiments may be applied to a convertible device (e.g., a device that can change from one or more configurations, etc.). For example, a device may be able to be used in a traditional laptop clamshell mode and may be converted to tablet mode. Additionally, various embodiments may be applied to a non-convertible (i.e., traditional) device form factors, e.g., tablets, bar-type phones or flip phones, smart phones generally, clamshell style laptops, e-readers, etc. Such non-convertible or traditional device form factors will benefit from several of the embodiments.

Accordingly, an embodiment may implement a device configuration based on at least one feature of the environment of a device detected using one or more sensors. In an embodiment, one or more sensors (e.g., image capture sensors, audio capture sensors, etc.) may be used to detect at least one feature of an environment, for example, the environment of the device. For example, a feature may be a grid pattern of a ceiling, a corner of a room, light, a picture/feature of a wall, or the like. Responsive to determining the at least one feature of an environment, an embodiment may implement a determined device configuration on the device. In an embodiment, data from at least one feature of an environment may be used in association with other device sensors such as inertial sensors, magnetometers, accelerometers, gyroscopes, or the like.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes a touch screen 170 for data input and display/rendering. System 100 also typically includes various memory devices, for example flash memory 180 and SDRAM 190.

Figure 2:
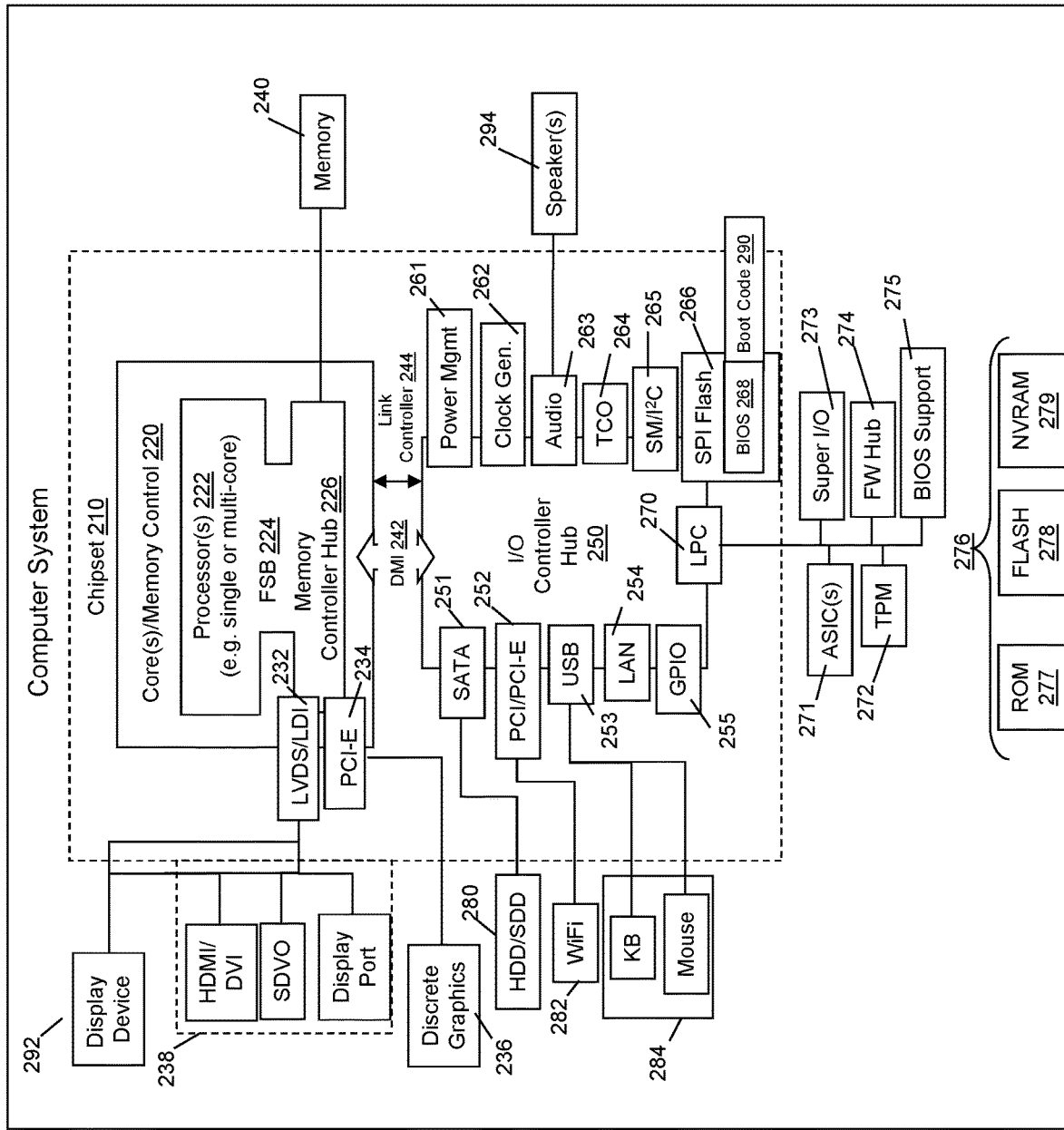
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which may include devices that can implement device configurations based upon device orientations. For example, the circuitry outlined in FIG. 1 may be implemented in a tablet or smart phone embodiment, whereas the circuitry outlined in FIG. 2 may be implemented in a personal computer embodiment.

Referring to FIG. 3, at 301 an embodiment may determine a device configuration using data and at least one feature of an environment of the device. In an embodiment, a device may be a smartphone, tablet, laptop, or the like. In an embodiment, the device may have a structural configuration including a flat configuration, a hinged configuration, or the like, and may include one or more input/output devices. The device may have a lower or main housing, including a keyboard, touch pad, display screen, or the like, and/or may have an upper or display housing, including a touch screen, display screen, or the like. The device may incorporate one or more sensors in one or both of the upper housing and the lower housing. For example, the device may include one or more sensors in a plurality of locations, e.g., disposed beneath an outer shell of the upper and lower housings, the surface area, the hinge (if any), and bezel areas. The one or more sensors permits the device to detect data associated with a device orientation as adapted to intelligently account for a device use mode or configuration.

In an embodiment, the device may be in a traditional clamshell mode in which the device is open, closed, open fully with the pieces against one another, or any position in between (i.e. tent mode). In an embodiment, the device may be a tablet or smartphone in a flat position. The disclosure contemplates non-traditional configurations as the method may be applicable to any device capable of receiving sensor data related to device orientation. An embodiment may detect the clamshell mode (or other use modes, as described further herein) using one or more sensors. For example, the main or lower housing of the device may include an orientation sensor or 9-axis sensor package that indicates that the device has been placed in a level position, e.g., on a table top, and is not undergoing movement. As another example, the device may contain inertial sensors, accelerometers, magnetometers, gyroscopes, or the like, in any combination thereof. Similarly, another sensor or sensors, such as a sensor disposed in the device hinge or hinges, as well as other locations, may indicate that the lid has been opened. Further, other sensors may be utilized, alone or in some combination, as further described herein with the non-limiting examples.

In an embodiment, one or more sensors may detect data associated with a device orientation. For clarity, the term "orientation" will be used to describe the position of the device within, or with respect to, an environment of the device. An orientation of a device in a physical space may include an axis of the device with respect to an environment or other portions of the device, a distance to a feature of the environment, an orientation to one or more users, or the like. The term "configuration" will be used to describe how the device is configured, for example, which screen a display is displayed on, how the device is positioned with respect to itself, and the like. The sensors used to detect data associated with the device orientation may include inertial sensors, accelerometers, magnetometers, gyroscopes, image capture devices, light sensors (i.e. visible and non-visible spectrum), temperature sensors, proximity sensors, GPS, or combination thereof, or the like. The one or more sensors may be disposed in a location within the device, on the surface of the device, or physically separate, but in communication with the device.

In an embodiment, at 302, the system may determine if the device configuration has been determined based upon the device orientation data and one or more features of the environment. The environment may be an environment of the device, for example, a room that the device is in, and the like. To determine an environmental feature, the system may use one or more sensors, for example, an image capture device. An image capture device may be one or more cameras. The one or more cameras may be a standard camera or a camera sensor disposed on one or more surfaces of the device. The one or more cameras may be positioned upon the device to best capture an image. For example, a tablet or smartphone may have a camera upon each planar surface of the device. Additionally or alternatively, a camera may be placed along one or more edges of the device. For example, a device with one of more hinges, such as a laptop, may require a greater number of cameras to capture image data for each portion of the device separated by a hinge.

In an embodiment, the image capture device may assist an embodiment in detecting the device position or orientation within an environment. In other words, the image capture device may collect cues from the environment to provide information as to the position of the device within the device environment. In an embodiment, one or more image capture device may be used in any combination with other one or more traditional orientations sensors such as inertial sensors, magnetometers, accelerometers, gyroscopes, or the like.

For example, one of more image capture devices may receive image data from the device environment, and the captured image data may be used to detect a device orientation. For example, an image capture device may capture an image of a tiled ceiling in an office environment, and the grid lines of the tiled ceiling may provide orientation data for a proper device orientation. In other words, as a device is moved in an environment, the capture image data from the movement of the device with respect to the grid-like ceiling tile pattern provides information as to the movement of the device.

A feature of the environment may include one or more parts of the environment that provide a line or reference point for the system. For example, an environment feature may include a corner of a room. The two walls that meet in the corner may be painted different colors, be a different material, or may have different light patterns (i.e. shadows, ambient light, etc.). As another example, an image capture device may distinguish a picture on a wall, a feature of the room, furniture, person, or the like. Any characteristic or feature of the environment detectable by the one or more sensors may be used. In other words, the feature of the environment may be any feature that can be used to determine the orientation of the device within the environment.

The captured image data may assist in detecting the movement of the device in the device environment. For example, if the system uses an image capture device, as the device is reoriented in the environment the feature as captured by the image capture device will also "move" or be reoriented with respect to the device. This feature can then be used to identify that the device has been moved or reoriented within the environment, even if the traditional orientation sensors do not detect the movement. As an example, if the user rotates a tablet on a flat surface, the traditional sensors may not detect this movement. However, using an image capture device, the system may detect that a ceiling tile is "moving", thereby indicating the that the device is being rotated. Any sensor capable of detecting a feature of the environment may be utilized.

For example, if the one or more sensors is an image capture device, then the device has a "picture" of the device environment. An image capture device may collect data of a feature of a room such as a picture on a wall. As the device moves in the room, the image capture device collects data associated with the location of the picture on the wall with respect to the device. In other words, if the picture on the wall "moves" with respect to the device, the device collects data on the real movement of the device. As another example, if a tablet is placed flat upon a table in a conference room with a tile ceiling, then the image capture device collects data to the "movement" of the grid-like pattern of the tile ceiling if the tablet is rotated upon the table. The relative "movement" of a feature of a device environment corresponds to the actual movement of the device within the device environment.

Determining a device orientation may include comparing the at least one feature of the device environment to the detected orientation data (e.g., the orientation data captured by the orientation sensors). Thus, the environment feature may be used to confirm or supplement an orientation determined using the device orientation sensor data. In an embodiment, a discrepancy between the detected data and the at least one feature may be identified. In this case, the system may weight the device orientation data and/or the environmental feature. The system may then use the information having the higher weight. For example, the system may weight information higher based upon a confidence level associated with the information. As an example, the system may have a high confidence associated with the environmental feature, and may therefore use the environment feature to determine the device orientation. Different techniques for resolving the discrepancies are contemplated and may be used.

In an embodiment, determining a device orientation may include comparing at least one feature of a device environment to a database of environment features. This database may include a correlation between a feature and an orientation of a device within the environment. In other words, the system or method may make use of a database to assist in the determination of a device position or orientation in an environment. For example, a device may be in a conference room that may be familiar to the device. The system may contain a database of known features of the conference room. For example, the system may contain information about the conference room such as the placement of furniture, pictures hanging upon the walls, location of windows, or the like. These known features in combination with data from one or more sensors may assist in the determination of a device orientation in a device environment.

In the event that the environment is previously unknown to the system, the system may store the unknown environment for subsequent access. In other words, the system may "learn" an unfamiliar environment, and may use stored environmental data for an improved user experience. For example, a device may be placed in a novel environment such as a room in which the device has not been in before or even a room that has been renovated or redecorated. In an unknown environment the system may rely on standard features of a room such as corners, ceiling tiles, or light fixtures to provide a device configuration. However, the system may learn the feature of the unknown room such as pictures on the wall, furniture, individuals associated with the room, or the like, and correlate these features with the orientation of the device within the environment.

In an embodiment, determining a configuration may include choosing a configuration based upon the device orientation data and the environmental feature. In other words, the configuration of the device may be correlated to the device orientation and environmental feature data. For example, the detected data associated with a device orientation and/or environment feature may be used to place the device in a device configuration corresponding to the identified orientation. As an example, if a tablet is placed flat upon a conference room table and one or more image capture sensors detect a "movement" of the grid-like pattern of the ceiling tiles, then the device may be placed in a device configuration to match the identified orientation as detected by the one or more image capture sensors. As another example, if the device is a clamshell type laptop placed in a "tent" configuration, then one or more sensors may detect data associated with a device orientation and determine a device configuration such that each portion of the clamshell has the proper device configuration.

In an embodiment, the device configuration comprises a configuration of at least one visual display on at least one physical display of the device. For example, if the device includes one or more physical display screens, the device configuration may include which display screen the visual display is displayed upon. In an embodiment, one or more displays may display respective content in a proper configuration for a user based upon detection of the orientation data and/or environment features captured from one or more sensors. In an embodiment, a configuration of any type of input or output modalities on the device may be matched. For example, configuration of virtual/traditional buttons, keyboards, touch pads, or the like may be configured based upon a detected orientation.

In an embodiment, the method and system may use all, part, or none of the sensor data to determine a device configuration. For example, the one or more sensors may collect image capture data, accelerometer data, and magnetometer data yielding a picture of the environment, movement of the device, and compass heading of the device respectively. These data may be used in whole, part, or not at all to determine a device configuration. If the device configuration cannot be determined at 302, the system may do nothing or implement a default device configuration at 303. For example, the device may retain a current configuration or wait for further detection of features of an environment or device orientation data from one or more sensors.

If, however a device configuration can be determined at 302, the system may implement the determined device configuration at 304. A device configuration may be displaying visual content in a proper configuration. For example, if a tablet with a display screen is placed upon a table and rotated from portrait to landscape, then the displayed image may be rotated such that a user may still see the displayed image in a proper configuration. A device configuration may be associated with an input device as well, such as a virtual keyboard, virtual/standard buttons, or the like. For example, if a tablet with a virtual keyboard or buttons is placed upon a table and rotated from portrait to landscape, then the virtual keyboard or buttons may be properly configured or positioned such that a user may still use the functions in a proper configured. The disclosure contemplates many devices capable of any movement with many input/output functions, and the illustrated examples are not meant to be limiting.

The various embodiments described herein thus represent a technical improvement to conventional device orientating techniques. Using the techniques described herein, an embodiment may detect using one or more sensors data associated with a device orientation, for example, traditional device orientation data and also environmental feature data. An embodiment may thereafter use the detected data to determine using the data and at least one feature of an environment of the device, a device configuration. Such techniques may reduce or eliminate instances of improper device configuration. Additionally, such techniques may reduce or eliminate the need for a user to manually set or move a device to achieve a proper device configuration.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:

detecting, using one or more sensors, orientation data associated with a device orientation, wherein the device orientation comprises a position of a device within an area where the device is currently located;

determining, using the orientation data and at least one environmental feature detected by the one or more sensors of the device, a device configuration, wherein the at least one environmental feature comprises at least one structural feature of the area where the device is currently located, wherein the device configuration comprises a use mode of the device, wherein the device configuration is based upon a placement of the device within and with respect to the area, wherein the determining comprises comparing the at least one environmental feature to the detected orientation data, wherein comparing the at least one environmental feature to the detected orientation data comprises producing a weight for each of the at least one environmental feature and the detected orientation data, wherein the device configuration is further based on the highest weighted of each of the at least one environmental feature and the detected orientation data; and implementing the determined device configuration on the device.

2. The method of claim 1, wherein the one or more sensors comprises an image capture device.

3. The method of claim 1, wherein the determining of the device configuration comprises comparing the at least one environmental feature to a database of environment features.

4. The method of claim 1, wherein the determining of the device configuration comprises identifying a second device orientation based upon the at least one environmental feature.

5. The method of claim 4, wherein the identifying the second device orientation comprises matching the device orientation and the identified second device orientation.

6. The method of claim 1, wherein the device configuration comprises an orientation of a display on at least one display screen of the device.

7. The method of claim 1, further comprising identifying the at least one environmental feature of an unknown environment and storing the unknown environment for subsequent access.

8. The method of claim 1, wherein the device orientation comprises an orientation of the device with respect to a physical space.

9. The method of claim 1, wherein the one or more sensors is at least one of: an inertial sensor, a gyroscope, and an accelerometer.

10. An information handling device, comprising:

one or more sensors;

a processor;

a memory device that stores instructions executable by the processor, wherein the instructions, when executed by the processor, causes the processor to:

detect, using the one or more sensors, orientation data associated with a device orientation, wherein the device orientation comprises a position of a device within an area wherein the device is currently located;

determine, using the orientation data and at least one environmental feature detected by the one or more sensors of the device, a device configuration, wherein the at least one environmental feature comprises at least one structural feature of the area where the device is currently located, wherein the device configuration comprises a use mode of the device, wherein the device configuration is based upon a placement of the device within and with respect to the area, wherein to determine comprises comparing the at least one environmental feature to the detected orientation data, wherein comparing the at least one environmental feature to the detected orientation data comprises producing a weight for each of the at least one environmental feature and the detected orientation data, wherein the device configuration is further based on the highest weighted of each of the at least one environmental feature and the detected orientation data; and implement the determined device configuration on the device.

11. The information handling device of claim 10, wherein the one or more sensors comprises an image capture device.

12. The information handling device of claim 10, wherein the instructions to determine comprise instructions to compare the at least one environmental feature to a database of environment features.

13. The information handling device of claim 10, wherein the instructions to determine comprise instructions to identify a second device orientation based upon the at least one environmental feature.

14. The information handling device of claim 13, wherein the instructions to identify comprises instructions to match the device orientation and the identified second device orientation.

15. The information handling device of claim 10, wherein the device configuration comprises an orientation of a display on at least one display screen of the device.

16. The information handling device of claim 10, wherein the instructions, when executed by the processor, further causes the processor to identify the at least one environmental feature of an unknown environment and to store the unknown environment for subsequent access.

17. The information handling device of claim 10, wherein the device orientation comprises an orientation of the device with respect to a physical space.

18. A product, comprising:

a storage device that stores code, the code being executable by a processor and comprising:

code that detects, using the one or more sensors, orientation data associated with a device orientation, wherein the device orientation comprises a position of a device within an area where the device is currently located;

code that determines, using the orientation data and at least one environmental feature detected by the one or more sensors of the device, a device configuration, wherein the at least one environmental feature comprises at least one structural feature of the area where the device is currently located, wherein the device configuration comprises a use mode of the device, wherein the device configuration is based upon a placement of the device within and with respect to the area, wherein the code that determines comprises code that compares the at least one environmental feature to the detected orientation data, wherein code that compares the at least one environmental feature to the detected orientation data comprises code that produces a weight for each of the at least one environmental feature and the detected orientation data, wherein the device configuration is further based on the highest weighted of each of the at least one environmental feature and the detected orientation data; and code that implements the determined device configuration on the device.

* * * * *